United States Patent [19]

Ichimura et al.

[11] Patent Number: 5,296,954
[45] Date of Patent: Mar. 22, 1994

[54] LIQUID CRYSTAL DISPLAY DEVICE HAVING MASKING FILMS BEING CONNECTED BY CONDUCTORS WHICH EXTEND ACROSS THE CENTRAL PORTIONS OF THE DISPLAY ELECTRODES

[75] Inventors: Yukiko Ichimura; Kojiro Tsubota, both of Nara, Japan

[73] Assignee: Sharp Kabushiki Kaisha, Osaka, Japan

[21] Appl. No.: 89,602

[22] Filed: Jul. 12, 1993

Related U.S. Application Data

[63] Continuation of Ser. No. 755,068, Sep. 5, 1991, abandoned.

[30] Foreign Application Priority Data

Sep. 11, 1990 [JP] Japan .................. 2-241716

[51] Int. Cl.⁵ .................................. G02F 1/133
[52] U.S. Cl. .......................... 359/67; 359/54; 359/68; 359/87
[58] Field of Search .............. 359/54, 67, 68, 87, 359/94

[56] References Cited

U.S. PATENT DOCUMENTS

| | | | |
|---|---|---|---|
| 4,470,667 | 9/1984 | Ikubo et al. | 359/68 |
| 4,568,149 | 2/1986 | Sugata et al. | 359/68 |
| 4,653,862 | 3/1987 | Morozumi | 359/68 |
| 4,712,874 | 12/1987 | Sekimura et al. | 359/68 |
| 4,761,058 | 8/1988 | Ikubo et al. | 359/54 |
| 4,824,213 | 4/1989 | Morokawa | 259/67 |
| 4,853,296 | 8/1989 | Fukuyoshi | 428/623 |
| 5,058,998 | 10/1991 | Yoshida et al. | 359/94 |
| 5,083,853 | 1/1992 | Ueki et al. | 359/54 |
| 5,161,043 | 11/1992 | Narutaki et al. | 359/67 |

FOREIGN PATENT DOCUMENTS

| | | | |
|---|---|---|---|
| 0338412 | 10/1989 | European Pat. Off. | 359/67 |
| 0385419 | 9/1990 | European Pat. Off. | |
| 2534052 | 4/1984 | France | |
| 0010720 | 1/1983 | Japan | 359/67 |
| 0249120 | 12/1985 | Japan | 359/67 |
| 0049326 | 3/1987 | Japan | 359/67 |
| 63-225222 | 9/1988 | Japan | |
| 0226626 | 9/1988 | Japan | 359/67 |
| 63-226626 | 9/1988 | Japan | |
| 0241522 | 10/1988 | Japan | 359/67 |

*Primary Examiner*—William L. Sikes
*Assistant Examiner*—Huy Mai

[57] ABSTRACT

First display electrodes are formed on a first electrode substrate. Second display electrodes are formed on a second electrode substrate in such a direction as to intersect at right angles with the first display electrodes. In order to obtain a liquid crystal display device provided with a screen having a large contrast ratio, masking films for intermittently masking regions between the display electrodes, formed on at least one of the first electrode substrate, and the second electrode substrate are formed on the display electrodes on the other electrode substrate.

16 Claims, 10 Drawing Sheets

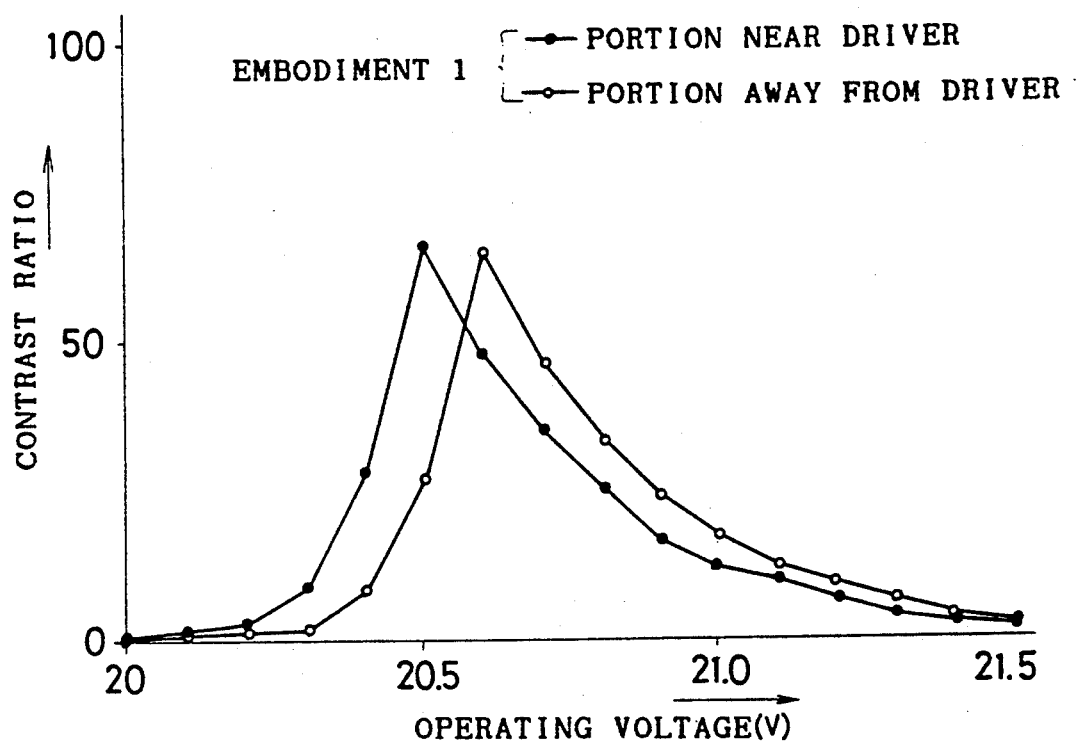
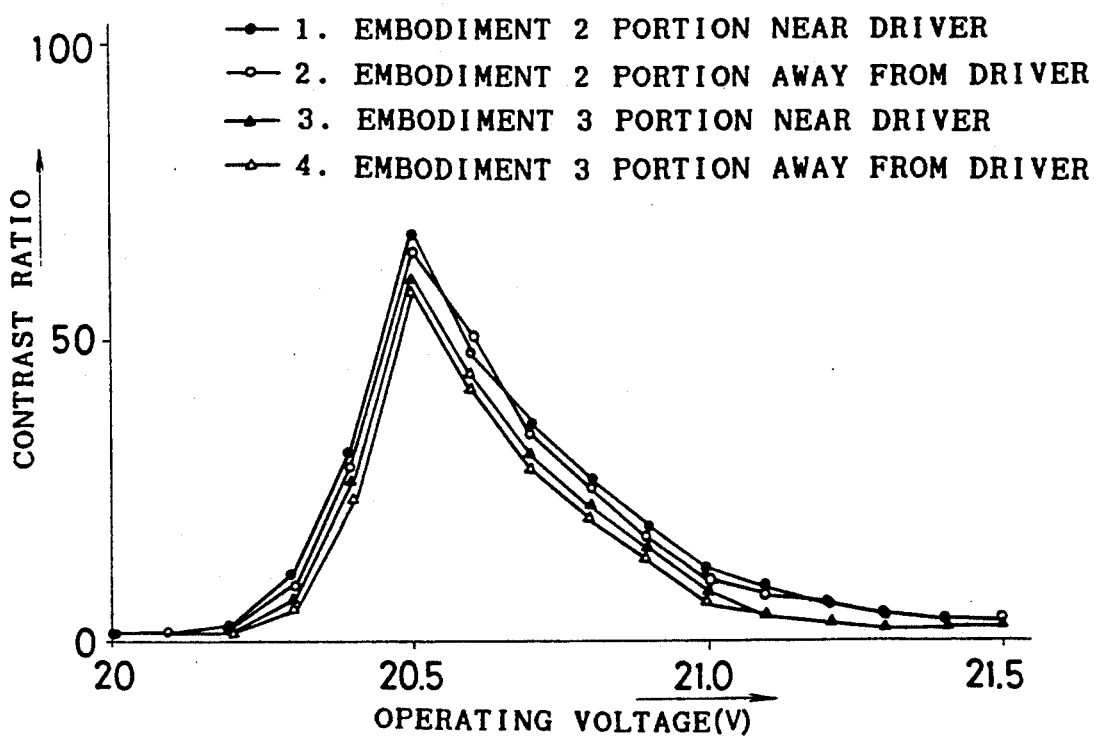

LIQUID CRYSTAL DISPLAY DEVICE HAVING MASKING FILMS BEING CONNECTED BY CONDUCTORS WHICH EXTEND ACROSS THE CENTRAL PORTIONS OF THE DISPLAY ELECTRODES

This application is a continuation of application Ser. No. 07/755,068 filed on Sep. 5, 1991, now abandoned.

BACKGROUND OF THE INVENTION

1. Field of the Invention

The present invention relates to a liquid crystal display device of the simple matrix type.

2. Description of Prior Art

FIG. 14 is a partial cross section of a prior art liquid crystal display device of the simple matrix type. This display device is a color liquid crystal display device of the super twisted nematic type, and comprises a first electrode substrate 10, a second electrode substrate 20, and a liquid crystal layer 9 filled between the first and the second electrode substrates 10 and 20. On a first substrate 1 constituting the first electrode substrate 10 are formed color filters 3 of red (R), green (G), and blue (B). The respective color filters 3 are formed with striping unidirectionally in parallel with one another as shown in FIG. 3. FIG. 14 is a cross section of the display device taken along the line 3—3 in FIG. 3. Between the respective color filters 3 are provided black masks made of material having a low transmissivity in parallel with one another. An insulating film 4 is formed entirely over the color filters 3 and the black masks 11.

On the insulating film 4 are formed first transparent display electrodes 3 in parallel with one another in a direction perpendicular to an extending direction of the color filters 3 as shown in FIG. 2. FIG. 14 is a cross section of the display device taken along the line 2—2 in FIG. 2. An orientation film 6 for regulating an orientation of liquid crystal molecules is formed entirely over the first display electrodes 5.

On a second substrate 2 constituting the second electrode substrate 20 are formed second transparent display electrodes 7 extending in a direction perpendicular to an extending direction of the first display electrodes 5. As shown in FIG. 15, the second display electrodes 7 are formed in parallel with the color filters 3 and overlapping therewith. FIG. 4 is a cross section of the display device taken along the line 5—5 of FIG. 15. An orientation film 8 is formed entirely over the second display electrodes 7.

A color liquid crystal display device comprises the display device shown in FIG. 14 as a drive cell and is generally provided with a compensation cell. A cell structure in the case where the compensation cell is provided is shown in FIG. 17. FIG. 17 shows the display device viewed from the compensation cell. An arrow 32 shows a direction along which an orientation film for an upper substrate of the compensation cell is rubbed. An arrow 33 shows a direction along which an orientation film for a lower substrate of the compensation cell is rubbed. An arrow 34 shows a direction along which an orientation film for an upper substrate of the drive cell is rubbed. An arrow 35 shows a direction along which an orientation film for a lower substrate of the drive cell is rubbed. In whichever the drive cell or the compensation cell, a twist angle of the liquid crystal molecule is set at 240°. A ratio of retardation in the drive cell (a product of anisotropy in index of refraction $\Delta nc$ and cell thickness dc) to retardation in the compensation cell (a product of anisotropy in index of refraction $\Delta nd$ and cell thickness dd) is set at $(\Delta nc \times dc)/(\Delta nd \times dd) = 0.90$. A solid line 30 shows a direction of a polarization axis of a polarizing plate on the compensation cell side. A broken line 31 shows a direction of a polarization axis of the polarizing plate on the drive cell side. By setting the polarizing plate as above, a display device capable of carrying out a normally black method can be obtained, according to which method a black display is performed when an OFF voltage V-off is applied, while a white display is performed when an ON voltage V-on is applied.

FIG. 16 graphically shows relationship between amplitude of the voltage applied to the liquid crystal layer between the first display electrodes 5 and the second display electrodes 7, and display luminance in the liquid crystal display device of the simple matrix type thus constructed, wherein a vertical axis represents relative display luminance and a horizontal axis represents the amplitude of an operating voltage. In FIG. 16, it is assumed that the display luminance is 100 in the case where a voltage V-on is applied to the liquid crystal layer between the first display electrodes 5 and the second display electrodes 7 when the display device is driven at a duty of 1/240. Then, the luminance is 1.5 in the case where the voltage V-off is applied. Accordingly, in a pixel region formed at an intersection of the first and the second display electrodes 5 and 7, a contrast ratio is greater than 50.

However, in a display device shown in FIG. 14, the black masks 11 formed on the first substrate 1 does not entirely cover the space defined between the first display electrodes 5 as will be seen from FIGS. 2, 3, and 15. Also, the voltage is not to be applied to the liquid crystal layer between the first display electrodes 5. More specifically, since the applied voltage becomes 0V, the luminance becomes about 20 as shown in FIG. 16. Accordingly, the contrast ratio of the display screen including the pixel regions and other regions becomes as low as about 8. Low contrast ratio results in degradation of the quality of the display. Further, in a color liquid crystal display device, low contrast ratio causes color purity to exceedingly deteriorate.

Further, in the display device adopting the normally white method for performing the white display when the voltage V-off is applied and the black display when the voltage V-on is applied, the contrast ratio in the regions other than the pixel regions are greatly reduced. Accordingly, degradation of the quality of display and the color purity becomes a further bigger problem for the display device of this type.

In order to prevent the reduction in contrast ratio, it can be considered to form masking films to cover the regions between the first display electrodes. In the case that such masking films are provided on the first electrode substrate 10 having the color filters 3 formed thereon, it is required that the masking films be formed between the first display electrodes and the first substrate 1. Accordingly, the first display electrodes 5 are formed on an uneven surface created by forming the masking films. When the first display electrodes 5 are formed on the uneven surface, the first display electrodes 5 are liable to be disconnected. Further, in the case where a leakage of the display electrodes 5 occurs, it is difficult to correct it. Even in the case where the masking films are formed between the second substrate 2, not having the color filters 3 formed thereon, and the second display electrodes 7, the second display electrodes 7 are liable to be disconnected due to the uneven surface caused by providing the masking films on the second substrate 2.

While more enlarged and highly complex display screens are being manufactured, there is a tendency toward manufacturing more thin and elongated display electrodes. In the color display device, since many pixels corresponding to the respective colors are provided, further thinner display electrodes are required. As the display electrodes become thinner in this way, resistance of the display electrodes increases, which in turn increases burdens on drivers or the like parts. This presents another problem.

SUMMARY OF THE INVENTION

It is an object of the invention to provide a liquid crystal display device including a screen having a large contrast ratio. It is another object of the invention to provide a liquid crystal display device having a display electrode with reduced resistance.

In order to fulfill the foregoing objects, a liquid crystal display device of the invention comprises, a first electrode substrate, a second electrode substrate, the first electrode substrate and the second electrode substrate facing each other, a plurality of first display electrodes formed on the first electrode substrate, a plurality of first display electrodes formed on the second electrode substrate in such a direction as to intersect at right angles with the first display electrodes, a liquid crystal layer filled between the first electrode substrate and the second electrode substrate, and a plurality of masking films for intermittently masking regions between the display electrodes formed on at least one of the first electrode substrate and the second electrode substrate, the masking films being formed on the display electrodes on the other electrode substrate. Accordingly, the regions between the display electrodes on the one electrode substrate are intermittently masked.

Also, the respective masking films formed on the display electrodes on the other electrode substrate may have conductivity and be connected to one another by wires having a low resistance. This causes the resistance of the display electrodes to be reduced, and thereby reduces burden on a driver or other parts accompanied by enlargement and complexity of the display devices.

Further, the liquid crystal display device of the invention comprises a first electrode substrate, a second electrode substrate, the first electrode substrate and the second electrode substrate facing each other, a plurality of color filters formed on the first electrode substrates, a black mask provided between the color filters, a plurality of first display electrodes formed on the color filters and the black films, a plurality of second display electrodes formed on the second electrode substrate in such a direction as to intersect at right angles with the first display electrodes, a liquid crystal layer filled between the first electrode substrate and the second electrode substrate, and a plurality of masking films for intermittently masking regions between the first display electrodes, the masking films being formed on the second display electrodes. Accordingly, the regions between the first display electrodes are intermittently masked.

Also, the respective masking films formed on the second display electrodes may be connected to one another by wires having conductivity.

Furthermore, the respective masking films formed on the second display electrodes may have conductivity and be connected to one another by wires having a low resistance. This causes the resistance of the second display electrodes to be reduced, and thereby reduces burden on a driver or other parts accompanied by enlargement and complexity of the display devices.

Moreover, liquid crystal molecules in the liquid crystal layer may be oriented between the first display electrodes and the second display electrodes by being twisted at a predetermined angle, wherein the twisted angle $\phi$ is set in an angle range of $210° \leq \phi \leq 270°$.

According to the invention, the liquid crystal display device comprises the masking films for masking the regions between the display electrodes formed on at least one of the first electrode substrate and the second electrode substrate, the masking films being formed on the display electrodes on the other electrode substrate. The masking films are formed only on the regions of the display electrodes on the other electrode substrate which cover the regions between the display electrodes on the one electrode substrate. Accordingly, the masking films intermittently mask the regions between the display electrodes on the one electrode substrate. Such masking films contribute to an improvement in the quality of display by improving the contrast ratio and color purity of the display device.

Further, the masking films formed on the display electrodes may be made conductive and connected to one another by the wires having a low resistance. This causes the resistance of the display electrodes to be reduced, thereby reducing the burden on the driver or the like parts accompanied by enlargement and complexity of the display device. Further, defect probabilities due to the disconnection of the display electrodes will be reduced, and it will not be complicated to detect and correct the disconnection.

BRIEF DESCRIPTION OF THE DRAWINGS

Other and further objects, features, and advantages of the invention will be more explicit from the following detailed description taken with reference to the drawings wherein:

FIG. 9 is a graph showing a relationship between an amplitude of an operating voltage and a contrast ratio in a portion close to and away from a driver of the embodiment shown with reference to FIG. 4;

FIG. 10 is a graph showing a relationship between an amplitude of an operating voltage and a contrast ratio in a portion close to and away from a driver of the embodiment shown with reference to FIGS. 5 and 6;

DETAILED DESCRIPTION OF THE PREFERRED EMBODIMENTS

Figure 1:
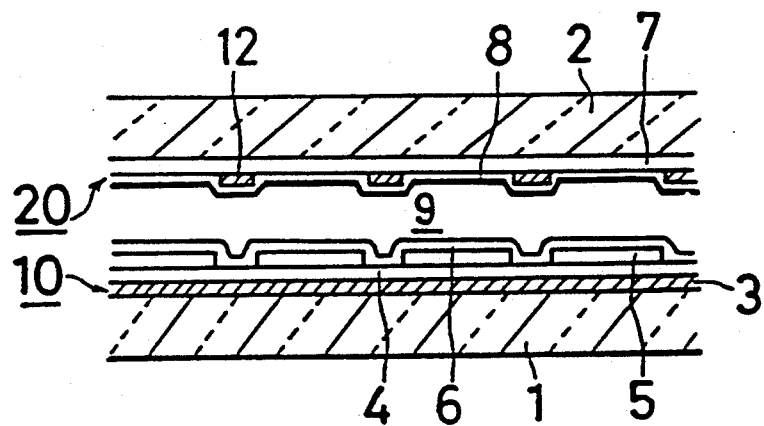
FIG. 1 is a cross section of a liquid crystal display device incorporating the invention as an embodiment.

Now referring to the drawing, preferred embodiments of the invention are described below.

First Embodiment

FIG. 1 is a cross section of a liquid crystal display device embodying the invention as an embodiment. It will be noted that a compensation cell is left out in FIG. 1 for the sake of simplicity although the display device of the invention comprises both a drive cell and the compensation cell. The display device of the invention comprises a cell structure shown in FIG. 17 and described with reference to the foregoing prior art. A twist angle $\phi$ of any liquid crystal molecule in either the drive cell or the compensation cell is set at 240°. Also, a ratio of retardation of the drive cell to that of the compensation cell $(\Delta nc \times dc)/(\Delta nd \times dd)$ is set at 0.90. The twist angle is set at 240° in this embodiment. However, it has been confirmed that effects of the invention are particularly remarkably noticeable as long as the twist angle $\phi$ is set in the following range in the display device:

$$210° \leq \phi \leq 270°$$

Figure 3:
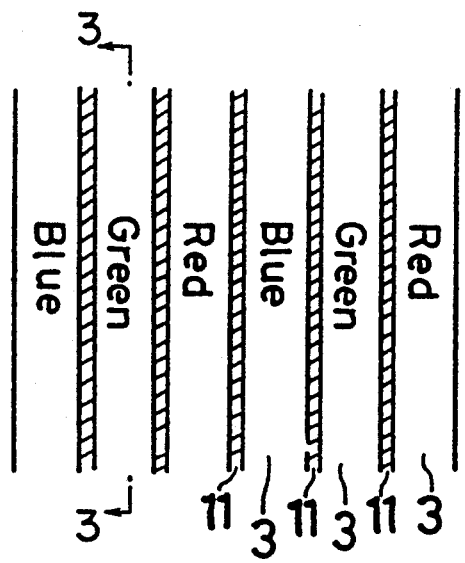
FIG. 3 is a plan view of color filters and black masks.

The liquid crystal display device of this embodiment is a color liquid crystal display device of the super twisted nematic type, and comprises a first electrode substrate 10, a second electrode substrate 20, and a liquid crystal layer 9 filled between the first electrode substrate 10 and the second electrode substrate 20. On a first transparent substrate 1 constituting the first electrode substrate 10 are formed color filters 3 of red (R), green (G), and blue (B). The color filters 3 as shown in FIG. 1 are formed with striping unidirectionally in parallel with one another as shown in FIG. 3. Between the respective color filters 3 black masks 11 are provided in parallel with one another. The spacings between the color filters 3 are set at 0.1 μm or less. An insulating film 4 is formed entirely over the color filters 3 and the black masks 11.

Figure 2:
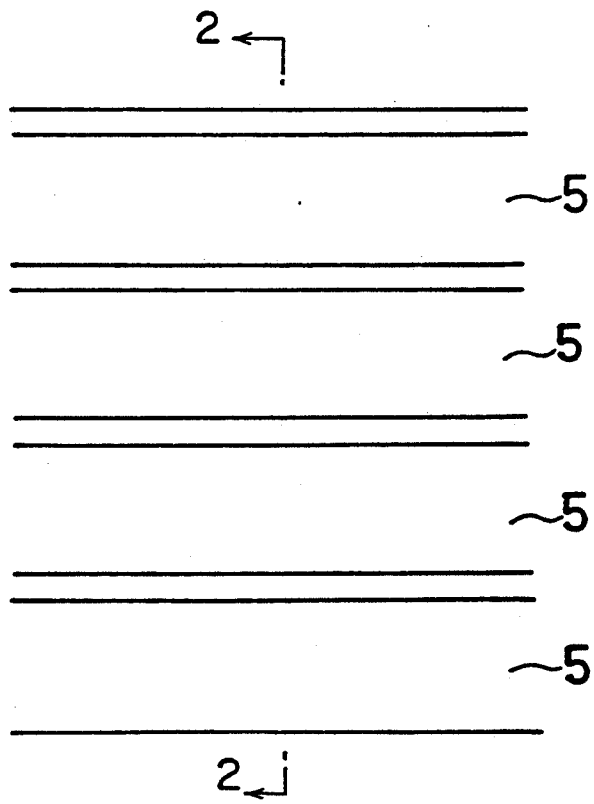
FIG. 2 is a plan view of display electrodes on one side of the display device of FIG. 1.

On the insulating film 4 are formed first transparent display electrodes 5 made of indium tin oxide (hereinafter referred to as ITO) in parallel with one another in a direction perpendicular to an extending direction of the color filters 3 as shown in FIG. 2. FIG. 1 is a cross section of the display device taken along the line 2—2 in FIG. 2. An orientation film 6 for regulating an orientation of the liquid crystal molecules is formed entirely over the first display electrodes 5.

Figure 4:
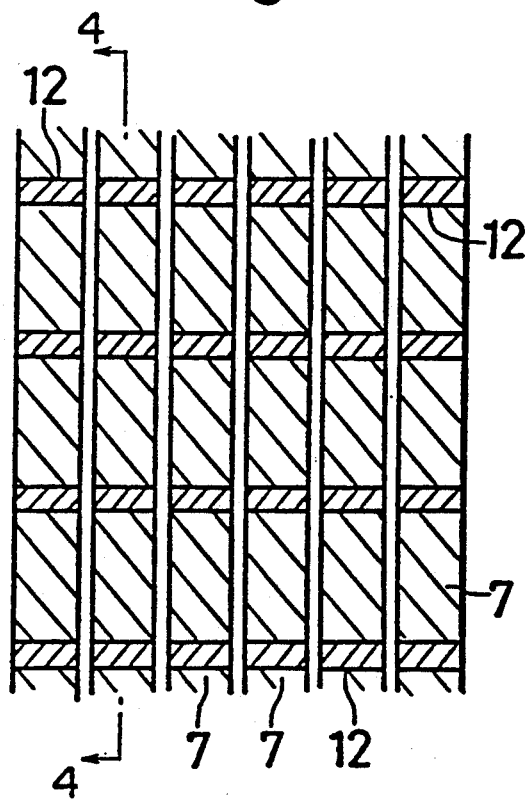
FIG. 4 is a plan view of display electrodes and masking films on the other side of the display device of FIG. 1.

On a second transparent substrate 2 constituting the second electrode substrate 20 are formed transparent display electrodes 7 made of ITO in parallel with one another in a direction perpendicular to an extending direction of the first display electrodes 5. The second display electrodes 7 are formed so as to be in parallel with the color filters 3 and nearly overlap therewith. Accordingly, the black masks 11 overlap with the regions between the second display electrodes 7. FIG. 1 is a cross section of the display device taken along the line 4—4 in FIG. 4.

On the second display electrodes 7 are formed conductive masking films 12 made of molybdenum (Mo) having a low transmissivity. The masking films 12 are so formed as to cover the regions between the first display electrodes 5 when the first electrode substrate 10 and the second electrode substrate 20 are affixed together. Further, the masking films 12 are formed only on the second display electrodes 7, but not on the regions between the second display electrodes 7. Accordingly, the regions between the first display electrodes 5 are masked by the masking film 12 while the second display electrodes 7 are masked by the black masks 11. Such masking films 12 can be formed by selective etching. The regions between the second display electrodes 7 unmasked by the masking films 12 are masked by the black masks 11. Therefore, all the portions other than pixels are masked by the black masks 11 and the masking films 12. In this way, the masking films 12 can be formed on the second display electrodes 7 without increasing the likelihood of occurrences of disconnection of the display electrodes 7.

While the masking films 12 are made of Mo metal in this embodiment, films made of metal such as Ti, Ta, Ni, and Al, of an inorganic material, and of organic material having a low transmissivity can also be used.

An orientation film 8 is formed entirely over the second display electrodes 7 and masking films 12.

Figure 7:
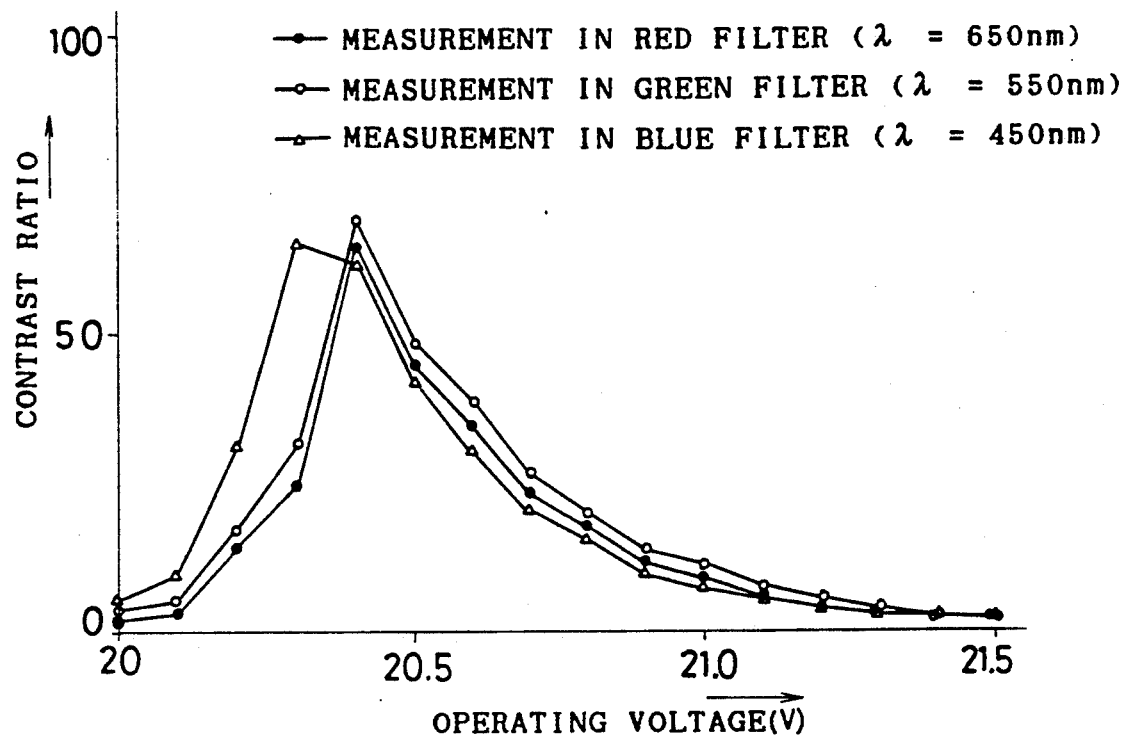
FIG. 7 is a graph showing a relationship between an amplitude of an operating voltage and a contrast ratio at an intersection of the display electrodes on both substrates.
Figure 8:
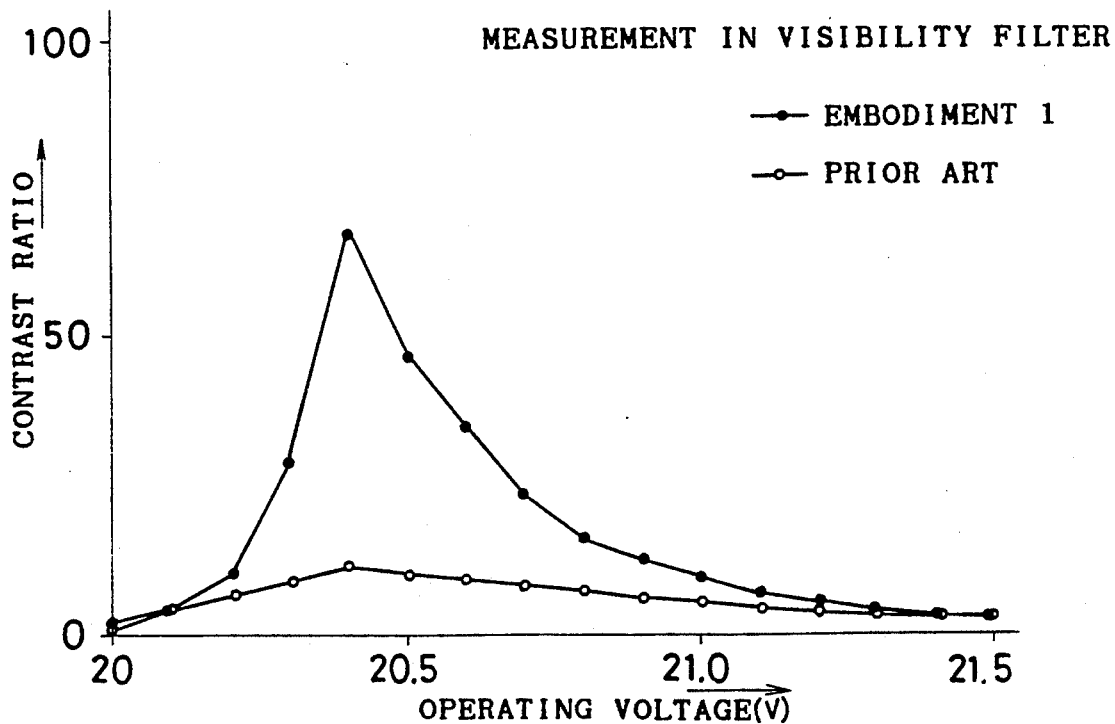
FIG. 8 is a graph showing a relationship between an amplitude of an operating voltage and a contrast ratio in the embodiment shown with reference to FIG. 4 and the prior art.
Figure 14:
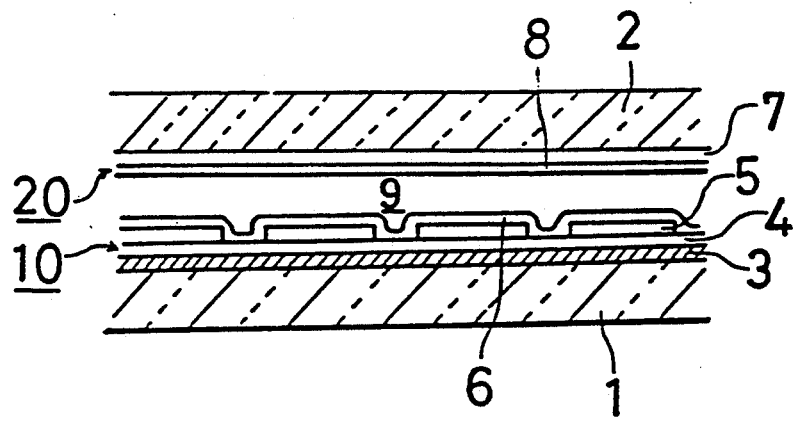
FIG. 14 is a cross section of a prior art liquid crystal display device.
Figure 15:
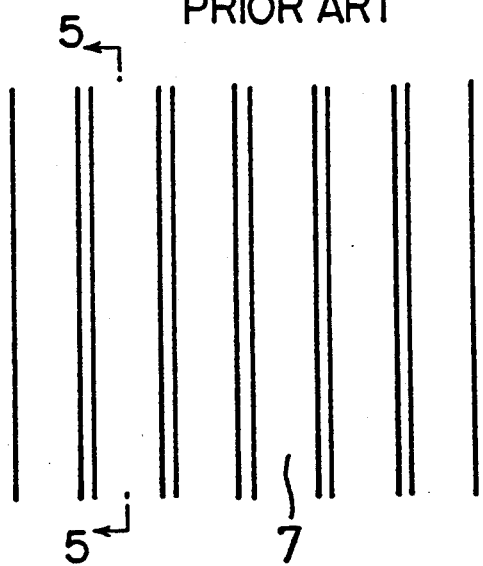
FIG. 15 is a plan view of display electrodes on one side of the display device of FIG. 14.
Figure 16:
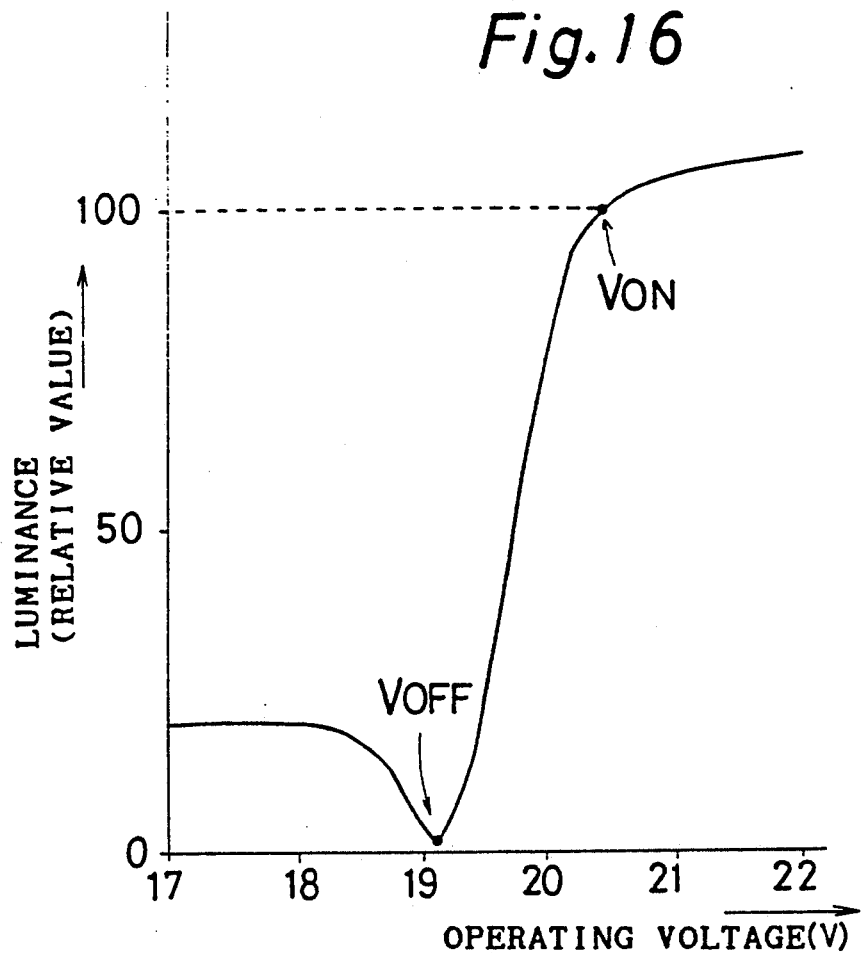
FIG. 16 is a graph showing relationship between an amplitude of an applied voltage and a display luminance at an intersection of the display electrodes on both substrates in a cell structure (display mode) shown in FIG. 17.

FIG. 7 shows a relationship between an amplitude of an operating voltage and a contrast ratio with respect to the pixels of respective colors when the liquid crystal display device of this embodiment is driven at a duty of 1/240. It could be seen from FIG. 7 that the respective colors can obtain high contrast ratios, and the operating voltages which give maximum contrast ratios for the respective colors lie within a substantially narrow voltage range. For comparison, FIG. 8 shows a relationship between the amplitude of the operating voltage and the contrast ratio when the display device of this embodiment and the display device of the prior art shown in FIG. 14 are driven at a duty of 1/240. It will be easily seen from FIGS. 7 and 8 that the display device of this embodiment has a high contrast ratio and thus a high quality of display.

Since the masking film 12 formed on the second display electrodes 7 are made of conductive Mo metal in this embodiment, the resistance of the second display electrodes 7 can be reduced. Accordingly, the burden on a driver can also be reduced. Further, in this embodiment, the masking film 12 formed on the second electrode substrate 20 are set to have the same size as the region between the first display electrodes 5 and not overlapping with the black masks 11. However, it has been confirmed that the effect similar to the foregoing can be obtained as long as the width of the masking film 12 relative to the region between the first display electrodes 5 is set at 0.7 to 1.2.

Second and Third Embodiments

Figure 5:
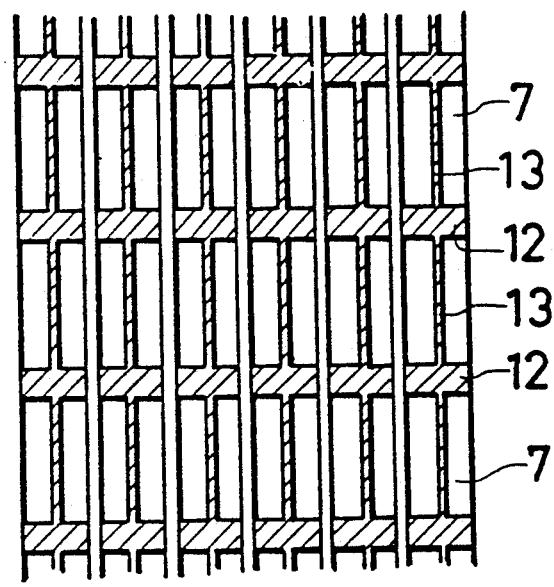
FIG. 5 is a plan view of display electrodes and masking films of another embodiment of the invention.

A liquid crystal display device of a second embodiment is identical to the display device of the first embodiment except that the masking films 12 formed on the second display electrodes 7 are connected to one another through wires 13 having a low resistance value provided in the middle between the second display electrodes 7 as shown in FIG. 5.

Figure 6:
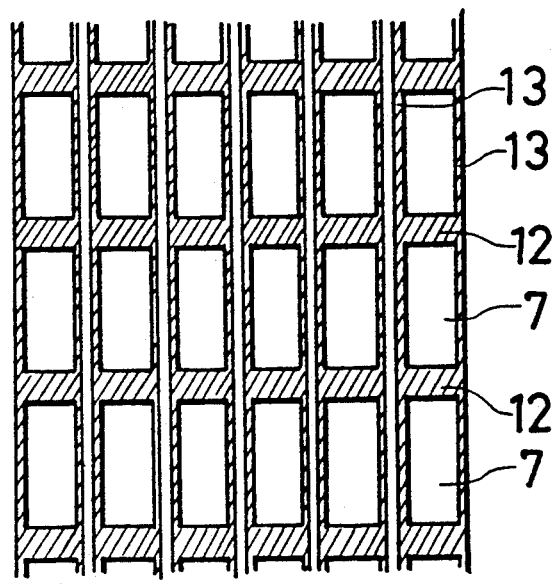
FIG. 6 is a plan view of display electrodes and masking films of still another embodiment of the invention.

A liquid crystal display device of a third embodiment is identical to the display device of the first embodiment except that the masking films 12 formed on the second display electrodes 7 are connected to one another through wires 13 having a low resistance value provided along opposite sides of the second display electrodes 7 as shown in FIG. 6.

The wires 13 are made of Mo metal similar to the masking films 12 in either the second embodiment or the third embodiment. The width of the wire 13 in the second embodiment is one-tenth of the width of the second display electrode 7, i.e., 20 $\mu$m. Also, the width of the wire 13 provided along one side of the second display electrode 7 in the third embodiment is one-twentieth of the width of the second display electrode 7, i.e., 10 $\mu$m.

It is preferable that the width of the wire 13 be set at one-fiftieth to one-fourth of the width of the display electrode 7 in the second embodiment and the third embodiment.

In the first embodiment, the masking film 12 cannot reduce sufficiently the resistance of the second display electrode 7. Accordingly, operating voltages which give maximum contrast ratios in respective portions close to and away from the driver of the second display electrodes 7 when the display device is driven at a duty of 1/240 differ from each other as shown in FIG. 9. Therefore, there are some cases where a uniform displayed image cannot be obtained in the display device of the first embodiment.

As opposed to the first embodiment, in the second and the third embodiments, operating voltages which give maximum contrast ratios in respective portions close to and away from the driver of the second display electrodes 7 when the display device is driven at a duty of 1/240 are substantially at the same level as shown in FIG. 10. Accordingly, a uniform displayed image can be obtained in the second and the third embodiments.

Figure 11:
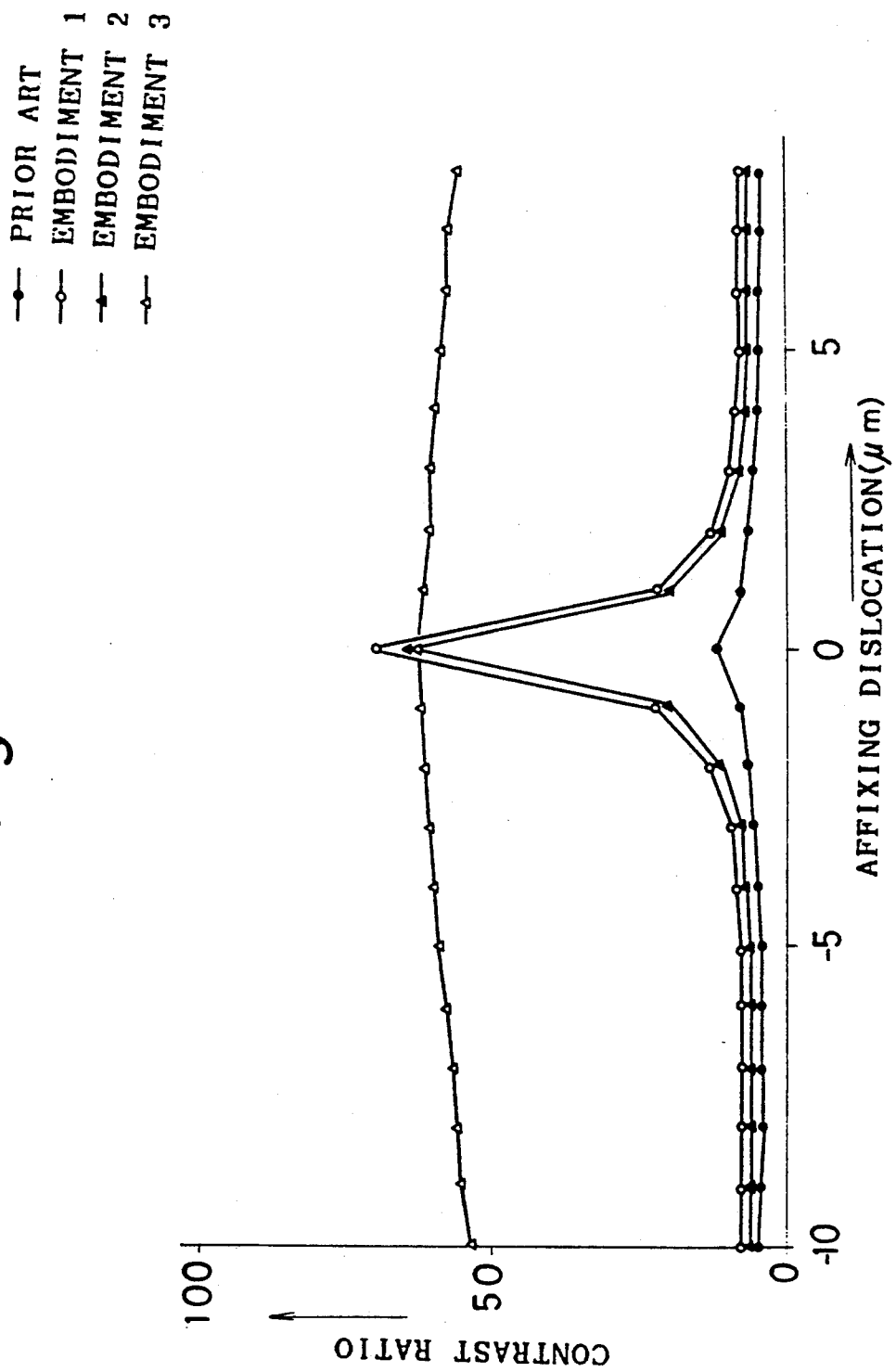
FIG. 11 is a graph showing a change in a maximum contrast ratio due to affixing dislocation of electrode substrates.
Figure 12:
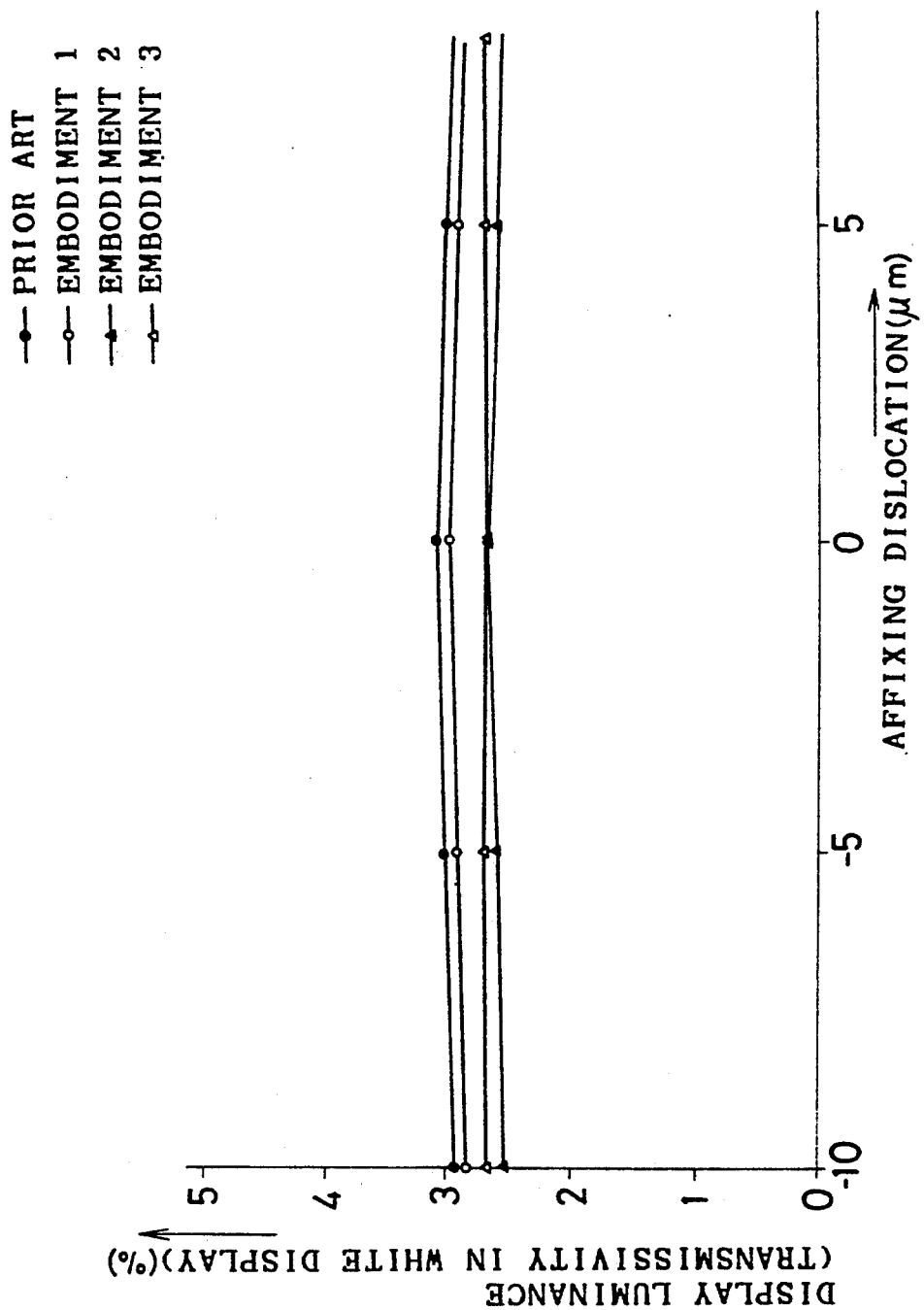
FIG. 12 is a graph showing a change in display luminance due to the affixing dislocation of the electrode substrates.
Figure 13:
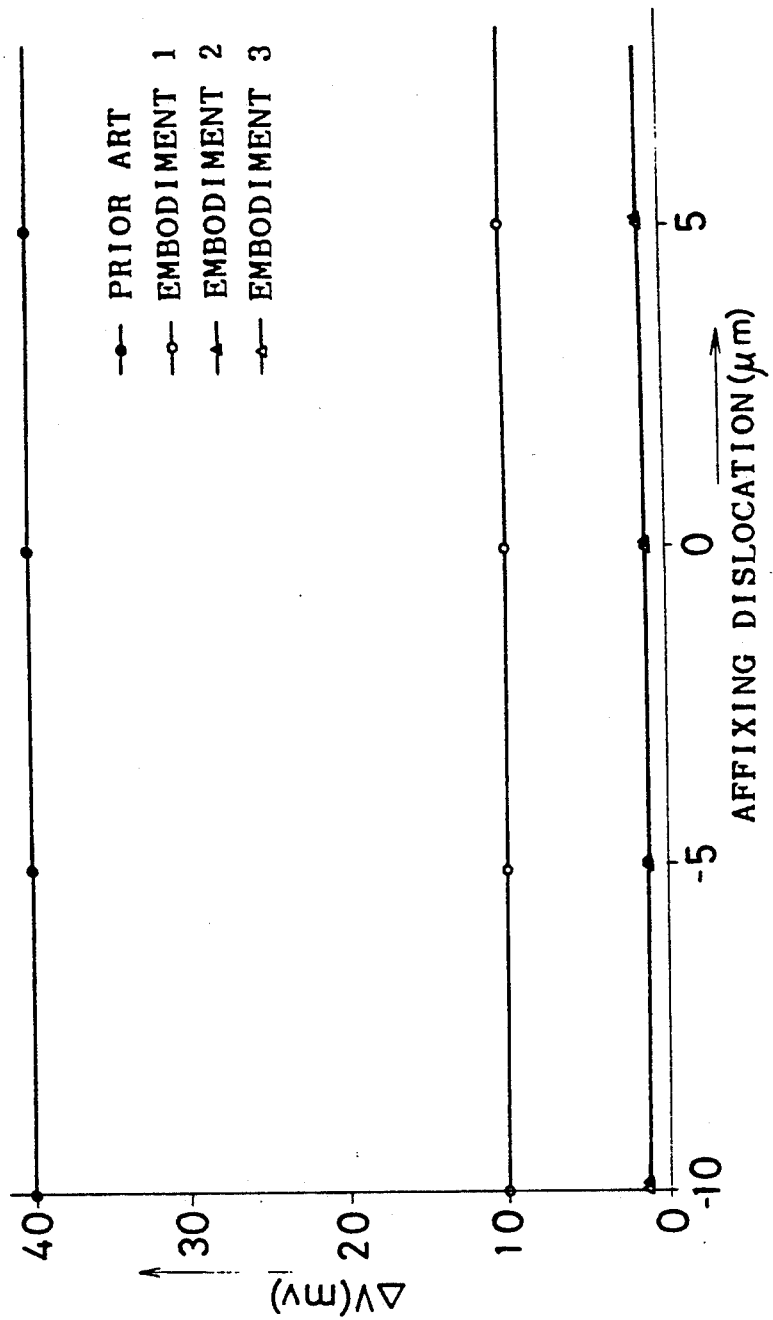
FIG. 13 is a graph showing a change in a difference Δ between an operating voltage which gives the maximum contrast ratio in a portion close to the driver and an operating voltage which gives the maximum contrast ratio in a portion away from the driver due to the affixing dislocation of the electrode substrates.

Next, there will be considered a case where the first electrode substrate 10 and the second electrode substrate 20 are affixed with being dislocated in an extending direction of the first display electrodes 5 in the first to the third embodiments. FIG. 11 shows a change in the maximum contrast ratio when the display device is driven at a duty of 1/240 versus the affixing dislocation of the first electrode substrate 10 and the second electrode substrate 20. FIG. 12 shows a change in display luminance (transmissivity in the case where the white display is performed) over the affixing dislocation of the first electrode substrate 10 and the second electrode substrate 20. FIG. 13 shows a change in a voltage difference $\Delta V$ between the operating voltages which give the maximum contrast ratios in the respective portions close to and away from the driver.

As will be seen from FIG. 12, the display luminance is not really subject to the influence of the affixing dislocation in the display device of any of the first to the third embodiments. The display device of the first embodiment which is not provided with the wire 13 has the largest display luminance. On the contrary, as will be seen from FIG. 11, the maximum contrast ratio changes greatly with the affixing dislocation in the prior art, the first embodiment and the second embodiment, while exhibiting almost no change in the third embodiment. This results from the fact that the wires 13 are so formed as to overlap with the black masks in the display device of the third embodiment. As will be seen from FIG. 13, the voltage difference $\Delta V$ is not really subject to the influence of the affixing dislocation in the display device of any of the first to the third embodiments. A value of $\Delta V$ is smaller in the first embodiment than in the prior art, and further is smaller in the second and the third embodiments than in the prior art. From this, it is understood that a more uniform displayed image can be obtained in the second and the third embodiments.

As described above, it is possible to reduce the resistance of the wires 13 in the second and the third embodiments. Particularly, the third embodiment has an advantage that the contrast ratio thereof is not to be reduced due to the affixing dislocation. Further, the display device of the first embodiment has an advantage of possessing the display luminance larger than those of the display devices of the second and the third embodiments. In consideration of the foregoing features, an optimum display device described with reference to the foregoing embodiments can be selected according to the needs.

Advantageous effects of the display devices of the foregoing embodiments are described with respect to only the case where the display device is driven at a duty of 1/240. However, it has been confirmed that similar effects can be obtained when the display device is driven at a duty of 1/20 to 1/500 according to the invention.

Figure 17:
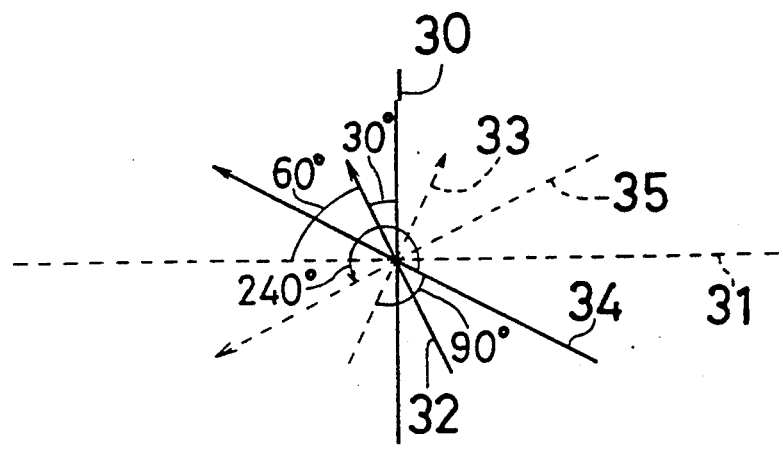
FIG. 17 is a diagram showing the cell structure when a compensation cell is to be provided.

Further, there has been described the display device including the drive cell and the compensation cell set forth with reference to FIG. 17 in the foregoing embodiments. However, it has been confirmed that similar effects can be obtained in other display devices having a monochromatic display mode such as a one-layer type display device having only a drive cell, a display device having a phase difference plate instead of a compensation cell, a display device having a compensation cell and a phase difference plate, or the like display device. Furthermore, it has been confirmed that, similar to the normally black mode in the foregoing embodiments, the effects of the invention can be obtained in a normally white mode. Moreover, although there has been described a color display device in the foregoing embodiments, similar effects can be obtained even in the case where the invention is applied to a monochromatic display device.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display device comprising:
   a first substrate;
   a second substrate, the first substrate and the second substrate opposing each other;
   a plurality of first display electrodes formed on the first substrate;
   a plurality of second display electrodes formed on the second substrate in a direction perpendicular to the first display electrodes;
   a liquid crystal layer located between the first substrate and the second substrate; and
   a plurality of masking films for intermittently masking regions between the display electrodes formed on at least one of the first and second substrates, said masking films being formed on the display electrodes on the other substrate of said first and second substrates, said masking films being further connected to one another in the middle part of the second display electrodes by wires having a low resistance and a width of 30 μm or less.

2. The liquid crystal display device of claim 1, wherein the plurality of masking films include molybdenum (Mo).

3. The liquid crystal display device of claim 1, wherein the plurality of masking films include a substance selected from the group consisting of Mo, Ti, Ta, Ni, and Al.

4. The liquid crystal display device of claim 1, wherein the wires include molybdenum (Mo).

5. The liquid crystal device of claim 1, wherein said display electrodes being intermittently masked comprises said first display electrodes formed on said first substrate and wherein said masking films and said wires are formed on said second substrate, and wherein said masking films are aligned with regions intermediate said first display electrodes.

6. The liquid crystal device of claim 5 and additionally including a plurality of masking elements formed on said first substrate for intermittently masking said second display electrodes formed over said second substrate.

7. The liquid crystal device of claim 6 wherein said masking elements formed on said first substrate are aligned with regions intermediate said second display electrodes.

8. A liquid crystal display device comprising:
   a first substrate;
   a second substrate, the first substrate and the second substrate opposing each other;
   a plurality of color filters formed in a first direction on the first substrate;
   a plurality of black mask elements formed on the first substrate between the respective color filters;
   a plurality of first display electrodes formed over the plurality of color filters and the plurality of black mask elements on the first substrate in a second direction perpendicular to the first direction;
   a plurality of second display electrodes formed on the second substrate in the first direction and perpendicular to the first display electrodes, the plurality of black mask elements being formed at locations intermediate the second display electrodes;
   a liquid crystal layer located between the first substrate and the second substrate;
   a plurality of masking films formed over the second display electrodes for intermittently masking regions intermediate the first display electrodes, said masking films being interconnected by relatively low resistance wire type conductors having a width of 30 μm or less and which extend across respective central portions of the second display electrodes.

9. The liquid crystal display device of claim 8, wherein said plurality of masking films include molybdenum (Mo).

10. The liquid crystal display device of claim 9 and, wherein said wire type conductors also include molybdenum (Mo).

11. The liquid crystal display device of claim 8, wherein said plurality of masking films include a substance selected from the group consisting of Mo, Ti, Ta, Ni, and Al.

12. The liquid crystal display device of claim 11, wherein said wire type conductors are formed of the same substance as plurality of masking films.

13. The liquid crystal display device of claim 8, wherein said wire type conductors are substantially 20 μm wide.

14. The liquid crystal display device of claims 1 or 8 wherein the liquid crystal layer includes liquid crystal molecules which are twisted between the first display electrodes and the second display electrodes at a predetermined angle, and the twist angle $\phi$ is set at an angle range of $210° \leq \phi \leq 270°$.

15. A liquid crystal display device comprising:
   a first substrate;
   a plurality of first display electrodes formed on said first substrate;
   a second substrate opposing said first substrate;
   a plurality of second display electrodes formed on the second substrate in a direction perpendicular to the first display electrodes;
   a plurality of black mask members formed on said first substrate for intermittently masking regions between the second display electrodes;
   a plurality of masking films of relatively low transmissivity formed over the second display electrodes for intermittently masking regions between the first display electrodes; and
   a plurality of low resistance conductors having a width substantially smaller than the width of said second display electrodes, said conductors connecting neighboring masking film portions of said plurality of masking films and extending across respective central portions of said second display electrodes,
   said masking films and said black mask members masking all portions of said first and second display electrodes other than pixel portions thereof, whereby the contrast ratio and color purity of the display device is improved.

16. The liquid crystal display device of claim 15, wherein the width of said wire type conductors range between 1/50 and ¼ of the width of the second display electrodes.

* * * * *